Jan. 23, 1968  J. MARTIN  3,365,150
FIRING MECHANISMS SUITABLE FOR AIRCRAFT
SEAT EJECTION DEVICES
Filed Nov. 16, 1965  2 Sheets-Sheet 1
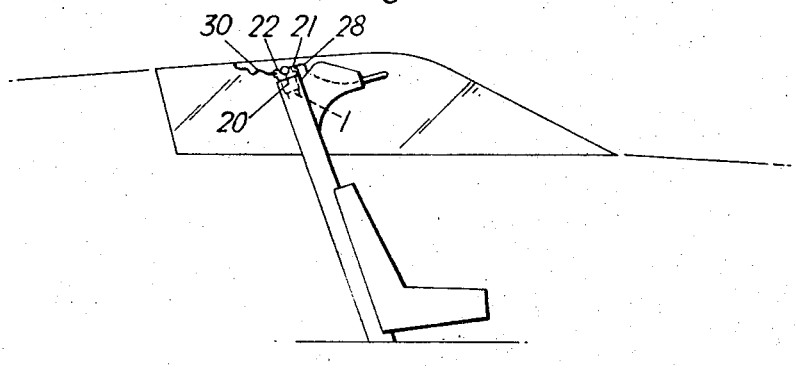
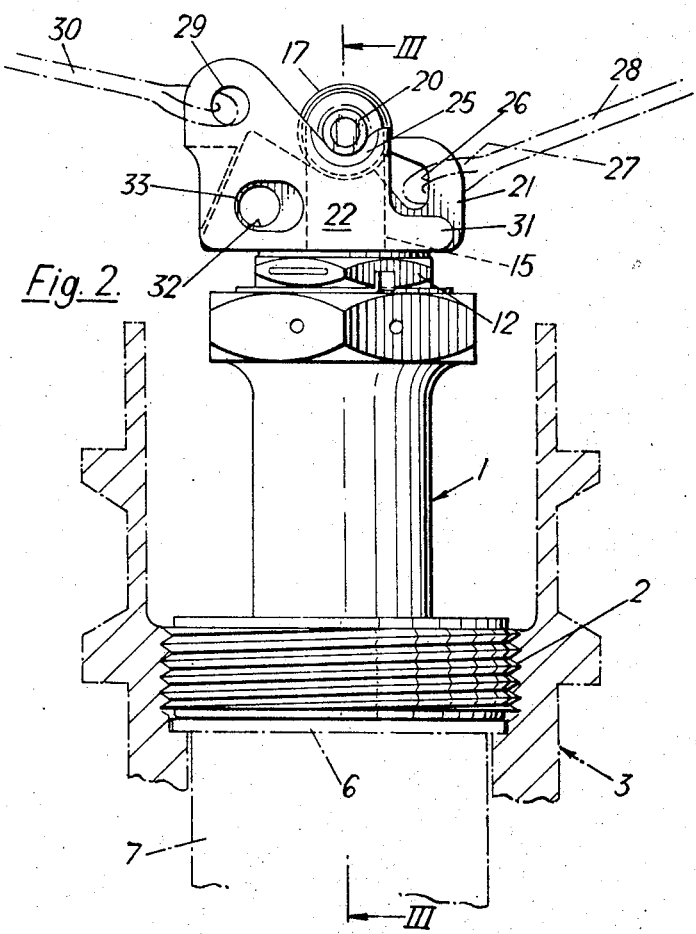
Inventor
JAMES MARTIN
By
Kurt Kelman
AGENT Inventor
JAMES MARTIN
By
Kurt Kelman
AGENT

United States Patent Office 3,365,150
Patented Jan. 23, 1968

3,365,150
FIRING MECHANISMS SUITABLE FOR AIRCRAFT SEAT EJECTION DEVICES
James Martin, Southlands Manor, Southlands Road, Denham, near Uxbridge, England
Filed Nov. 16, 1965, Ser. No. 508,109
Claims priority, application Great Britain, Dec. 23, 1964, 52,361/64
3 Claims. (Cl. 244—122)

ABSTRACT OF THE DISCLOSURE

A safety arrangement for an aircraft seat ejection mechanism having a plunger spring biased to operate a firing pin. A bifurcated plunger portion normally extends outside a housing and is restrained by two sears interposed between the housing and rollers on a pin passing transversely through the bifurcations, one sear being received between the bifurcations, the other being U-shaped and straddling the bifurcations. The spring is compressed by camming cooperation between said one sear and the associated roller, and by movement of the other sear about a pivot projection therefrom and engaging the housing during withdrawal of the sears.

---

This invention concerns firing mechanism suitable for seat ejection devices of the kind comprising an ejection gun adapted for launching a seat from an aircraft, spacecraft or the like upon the uncovering of an ejection opening in the aircraft, such ejection opening usually being the upper part of the aircraft cockpit or fuselage and usually covered by a canopy, although the opening could be in the lower part of the aircraft fuselage where downward seat ejection is envisaged, the ejection opening then being closed normally by a jettisonable or openable cover. It will be appreciated that such opening may be provided in any suitable position around the fuselage, especially where ejection is envisaged from vertically launched spacecraft. Hereinafter the terms "cockpit canopy" or "canopy" will, except where the text otherwise implies, be used generically to cover all of the above arrangements.

In aircraft ejection devices of the aforesaid character the ejection gun is usually of the type which comprises relatively slidable or telescopically arranged colinear parts, one part adapted to be anchored to the aircraft and a further part adapted to carry the ejection seat from the aircraft when the gun is fired, a breech chamber for receiving a cartridge for generating gas pressure to cause relative seat ejecting movement between the said relatively slidable gun parts, and firing mechanism for firing said cartridge when it is desired to eject the ejection seat from the aircraft.

Before the airman or other occupant (hereinafter referred to as "airman") can be safely ejected from an aircraft generally it is first necessary to form an ejection opening in the fuselage of the aircraft sufficiently large to permit the passage therethrough of the ejection seat and its occupant. This is not necessarily the case, however, where a frangible canopy is utilized. In some cases, however, the ejection opening is formed by opening hinged canopy sections and with this arrangement it is, in some instances, necessary to effect the opening of a hinged cockpit canopy beyond a normal open position in which the occupant is afforded normal access to and from the aircraft, to an emergency open position in which the opening provided is large enough for the passage therethrough of the ejection seat and its occupant. In other cases the ejection opening is created by entirely jettisoning the cockpit canopy prior to ejection of the seat and its occupant.

In any case it is very desirable that it should be possible to effect canopy opening to the emergency position or to jettison the canopy completely without it causing the ejection seat to be subsequently launched. Moreover, it is desirable that it should be immaterial in the case of an emergency in what order the airman takes action to form the ejection opening and to eject the seat, the only important item being that the seat should not be ejected before the ejection opening is formed.

Thus, the invention is concerned with firing mechanism for firing an ejection seat gun of the type above described, such firing mechanism being of the kind comprising a firing pin actuated by a firing plunger slidably mounted in a housing or breech block and biassed in a firing direction by means of a powerful spring, and dual restraining means for preventing the said plunger from moving from its normal or cocked position under the action of the said biassing spring until the restraint exercised by both of said restraining means on the plunger has been removed, the removal of such restraint being achieved by removing one of said restraining means by the uncovering of the ejection opening in the aircraft to the extent necessary to permit seat ejection, and by removing the other said restricting means by means under the control of the airman requiring to be ejected from his aircraft, such dual restraining means comprising a pair of sears, one of such sears being associated with the canopy and the other sear being associated with the seat occupant's ejection initiating mechanism.

Said firing plunger is provided with a bifurcated portion outside the housing such bifurcated portion embracing an abutment, preferably in the form of a roller, and one of said sears engages the underside of this abutment and passes between the bifurcations.

The second sear lies outside the bifurcations and engages a pair of abutments carried by the two bifurcations and provided by a single pin which passes through the bifurcations and serves to support the said roller positioned therebetween.

According to one feature of this invention, said sear having the two abutment-engaging surfaces is generally U-shaped in section and is so shaped that withdrawal of the sear in an upward direction ensures that the firing plunger is raised to the full extent permitted by the said spring. This arrangement ensures complete and satisfactory energising of such spring. To provide such satisfactory raising of the firing plunger the sear is provided with at least one projection extending from one of the arms thereof and slidably abutting against said housing.

In order that this invention may be more readily understood one embodiment of firing mechanism will now be described by way of example and with reference to the accompanying drawings in which:

FIGURE 1 is a fragmentary diagrammatic view of an aircraft provided with an ejection seat with ejection gun having dual restraining means in accordance with this invention;

FIGURE 2 is an elevational view of the ejection gun firing mechanism showing two sears constituting the dial restraining means;

Figure 3:
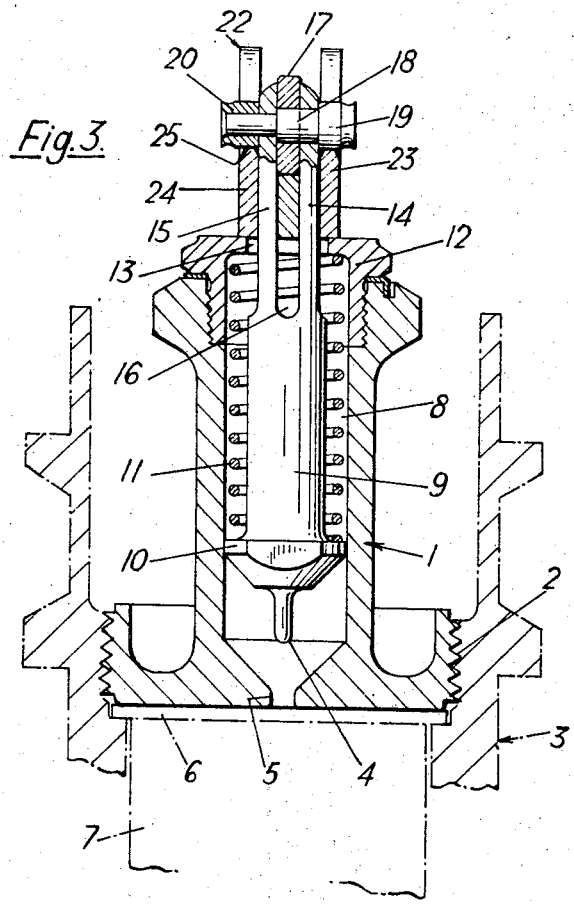
FIGURE 3 is a part sectional view on the line III—III of FIGURE 2.

In this embodiment the firing mechanism comprises a housing or breech block 1 which is generally cylindrical and which carries towards its lower end a threaded portion 2 which is adapted to be secured to an ejection gun diagrammatically illustrated 3 in such a manner that a pin 4 protruding through an aperture 5 from the end of the body 1 adjacent this threaded portion will engage the initiating cap 6 of a gas-generating cartridge 7 within the gun 3. The aperture 5 through which said pin 4 may pass is connected to a main bore 8 of the cylindrical housing 1 and this bore 8 houses a plunger 9 which carries, at its lower end, the said firing pin 4. The lower end of the plunger 9 is provided with an outwardly-directed flange 10 which serves to support a compression spring 11 trapped within the cylindrical bore 8 around the plunger 9 by a closure plug 12 threadedly engaged in the end of said bore 8 remote from the aperture 5.

The said plug 12 is apertured at 13 to permit the end of the plunger 8 remote from the firing pin 4 to protrude therethrough. This latter end of the plunger is bifurcated and the two bifurcations (designated 14, 15) define a slot 16 in which a roller 17 is positioned, such roller 17 being supported by a pin or axle 18 passing through the bifurcations 14, 15 and through the roller 17. Such pin 18 protrudes outwardly from the two bifurcations 14, 15 and each protruding end of the pin or axle 17 carries a further roller, these rollers respectively being designated 19, 20, such rollers being retained on the pin 18 by peening the ends thereof.

The said plunger 9 is retained in a position in which the compression spring 11 is partially compressed and energised as a result of a sear 21 being positioned under the roller 17 between the bifurcations 14, 15, such sear engaging both the roller 17 and the upper surface of said plug 12. In such an arrangement, with a suitably shaped sear (in the present case a substantially wedge shaped sear), it will be appreciated that withdrawal of the sear 21 would first cause further compression of the spring 11 until the sear 21 has been withdrawn whereupon the plunger would be free to move under the influence of the compressed spring into a position where it would strike the percussion cap 6 of a gas-generating cartridge 7.

However, a second sear 22, substantially U-shaped in plan, is provided, this sear 22 serving to prevent initiation of the gas generating cartridge 7 merely on withdrawal of sear 21. The arms 23, 24 of such U-shaped sear are each provided with an indentation 25 between shoulders which pivotally engage the said rollers 19, 20 on the protruding portions of the pin or axle 18. The said U-shaped sear 22 lies between the said plug 12 and said rollers 19, 20 so that, even if the first sear 21 between the bifurcations 14, 15 were withdrawn, the firing pin could not move to its gas-generating cartridge firing position. Similarly, if the U-shaped sear 22 were withdrawn without withdrawal of the other sear 21 between the bifurcations 14, 15 the same situation would occur. Thus, to allow the plunger 9 to move the pin 4 into a cartridge firing position both sears 21, 22 must be withdrawn.

In this particular embodiment the sear 21 between the bifurcations 14, 15 is provided with a hook-like portion 26 which serves to receive an eyelet 27 in the end of a flexible cable 28 leading to a manual ejection firing lever adapted to be actuated by the occupant of the ejection seat when ejection is to take place. Actuation of such manual control lever also causes initiation of a canopy release and jettisoning mechanism. The U-shaped sear 22, however, is provided with an aperture 29 for attachment to a flexible cable 30 connected to the canopy of the aircraft.

Thus, it will become immediately apparent that until both the canopy has been jettisoned and the sear 22 withdrawn and also the sear 21 connected to the operating lever has been withdrawn, ejection of an ejection seat fitted with an ejection gun adapted to be fired by this firing mechanism cannot take place. Such an ejection seat is indicated diagrammatically in the accompanying drawings.

Figures 4, 5:
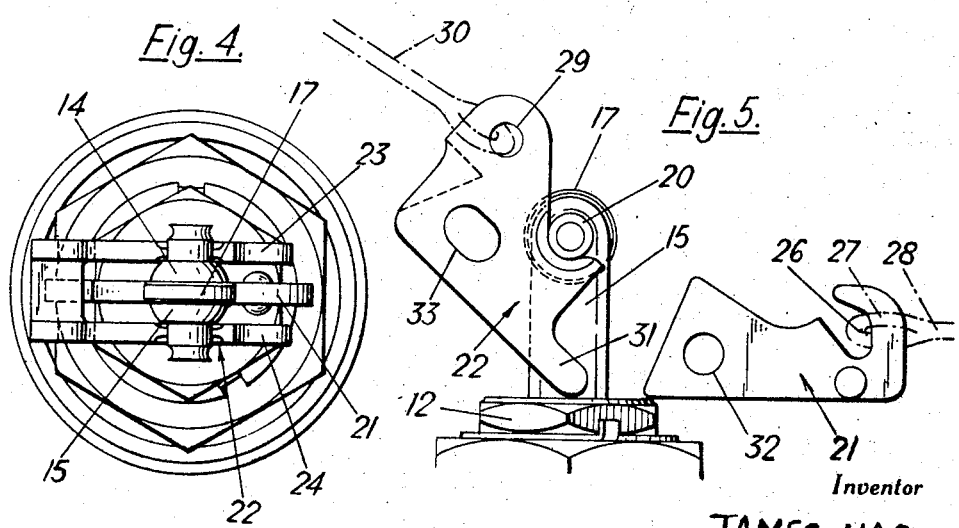
FIGURE 4 is a plan view of the firing mechanism of FIGURES 2 and 3.
FIGURE 5 is an elevational view, similar to FIGURE 2, showing the position of the firing mechanism at a stage after removal of one of the two sears constituting the dial restraining means but immediately prior to removal of the other of the two sears.

The U-shaped sear 22 is provided at the free ends of the arms 23, 24 of the U with radiused projections 31 which pivotally engage the said plug 12 when the sear 22 is withdrawn by the cable 30 in an obliquely upwardly direction (FIG. 5) so that the plunger is raised by the shoulders 25 pivotally engaging the rollers 19, 20 to the full extent permitted by the spring prior to release of such plunger.

The two sears 21, 22 are slotted respectively at 32, 33 to permit a safety pin (not shown) to be placed therethrough so that when servicing the mechanism or another part of the ejection seat there is no possibility of accidental firing of the mechanism. However, the provision of the slot 33 enables a small movement of the sear 22 with respect to the sear 21 to enable the flexible cable 28 normaally engaged in the hook 26 of the sear 21 to be disconnected.

I claim:

1. In a firing mechanism for firing an ejection seat gun in an aircraft, the mechanism having a firing pin, a plunger for actuating the pin, a housing slidably receiving a portion of the plunger, spring means for biasing the plunger in a firing direction inwardly of the housing, a first sear and a second sear normally preventing the plunger from moving in said direction under the action of said spring means until in said direction under the action of said spring means until one of the sears is removed by the uncovering of an ejection opening in the aircraft and the other sear is removed by means under the control of an airman to be ejected, the plunger having a bifurcated portion outside the housing, pin means on said plunger between said bifurcations and outside thereof, said first sear being normally received between said bifurcations in simultaneous abutting engagement with said pin means and said housing, the second sear being U-shaped and the leg portions thereof abuttingly engaging said pin means outside each of said bifurcations, means for withdrawing one of said sears from the normal position thereof substantially perpendicularly to said firing direction, and means for withdrawing the other sear from the normal position thereof obliquely relative to said firing direction and away from said housing, said one sear having a cam portion engaging said pin means for lifting said plunger from said housing and for thereby compressing said spring means during withdrawal of said one sear, the improvement in the other sear which comprises:

(a) said other sear being abuttingly interposed between said housing and said pin means; and (b) projecting pivot means on said other sear abuttingly engaging said housing during said withdrawing of said other sear, said pivot means being offset from said pin means in a direction opposite to the oblique direction of withdrawal, whereby said other sear is pivoted on said housing and said plunger is lifted from said housing during the withdrawal of said other sear.

2. In a mechanism as set forth in claim 1, said other sear being said second sear, and said pivot means abuttingly engaging said housing in said normal position of the second sear.

3. In a mechanism as set forth in claim 2, said pin means including a pin member passing through said bifurcations and three rollers on said pin member, one of said rollers being interposed between said bifurcations and normally engaging said first sear, and the other two rollers being offset from respective bifurcations in a direction away from the other bifurcation and engaging said second sear.

References Cited

UNITED STATES PATENTS

| 2,969,209 | 1/1961 | Martin | 244—122 |
| 2,971,728 | 2/1961 | Martin | 244—122 X |
| 2,971,729 | 2/1961 | Martin | 244—122 |

MILTON BUCHLER, *Primary Examiner.*

B. BELKIN, *Assistant Examiner.*